Aug. 12, 1969   L. G. JORGENSEN   3,461,022
METHOD AND APPARATUS FOR SPLICING FILM
Filed May 17, 1966   2 Sheets-Sheet 1
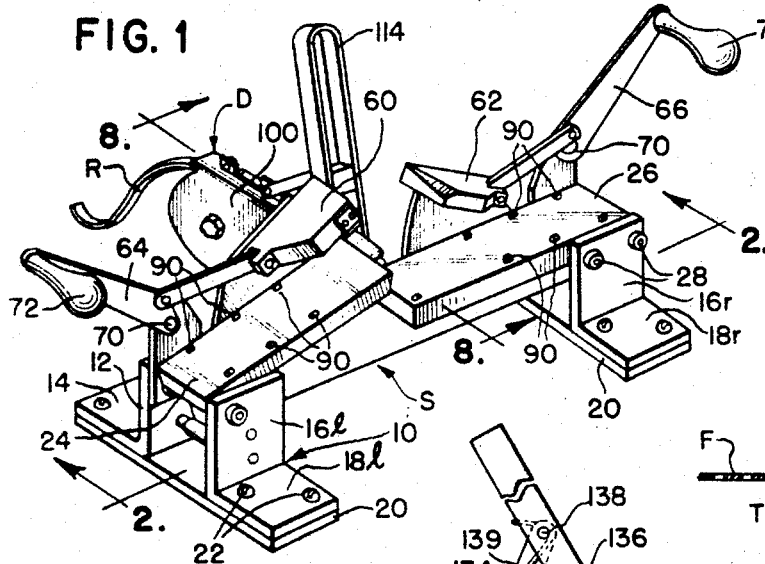
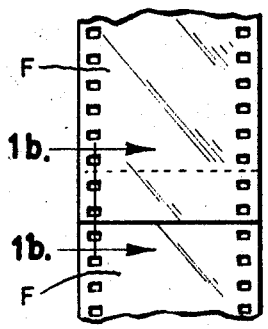
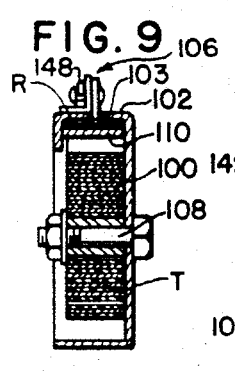
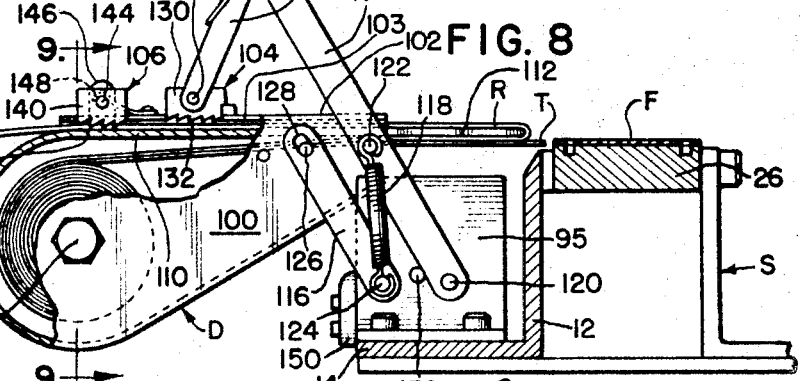
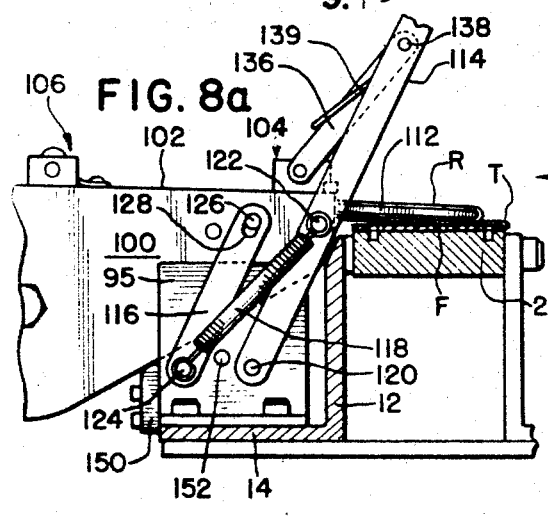
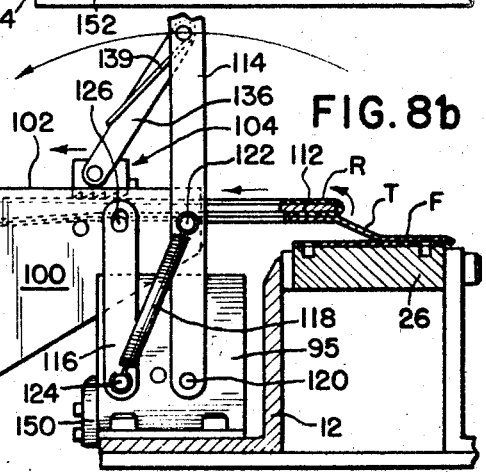
Inventor
Leif G. Jorgensen
By Richard W. Carpenter
Attorney Aug. 12, 1969  L. G. JORGENSEN  3,461,022
METHOD AND APPARATUS FOR SPLICING FILM
Filed May 17, 1966  2 Sheets-Sheet 2
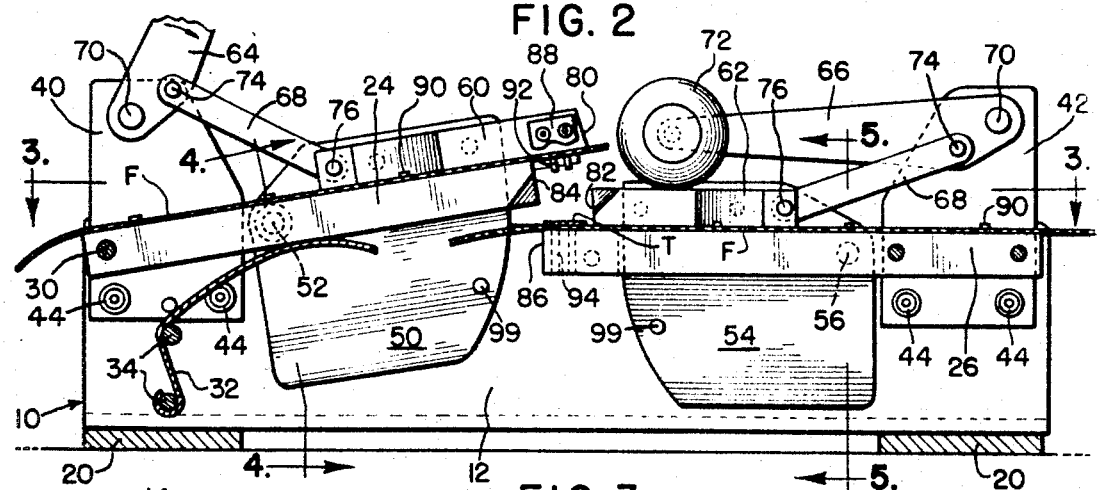
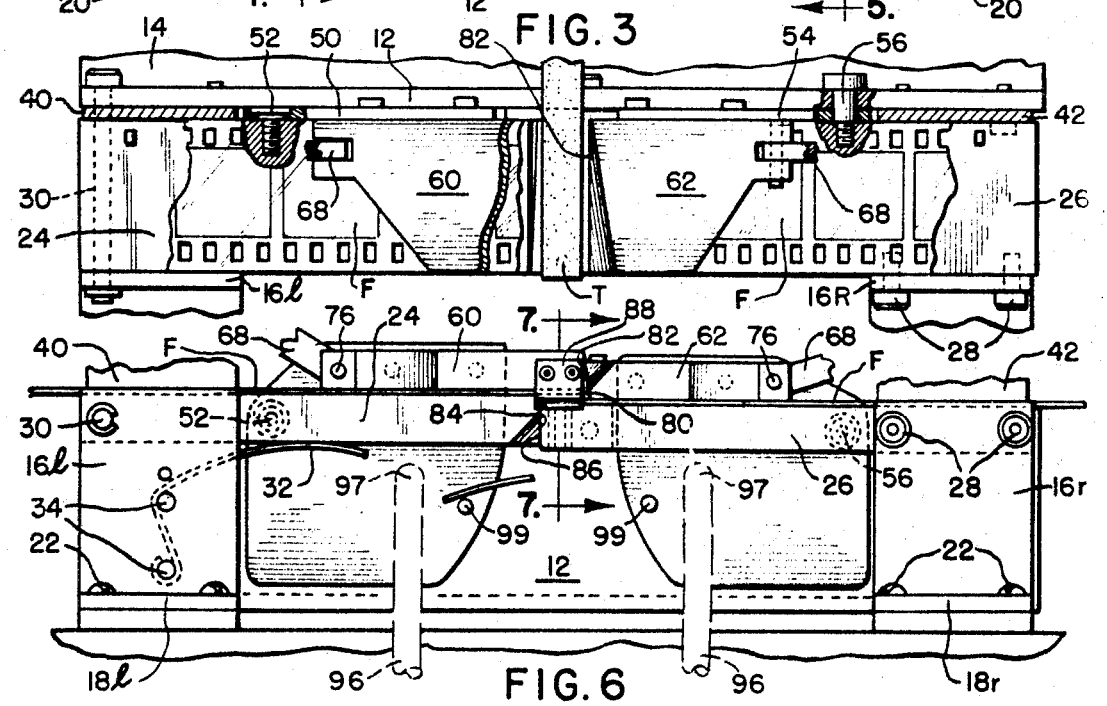
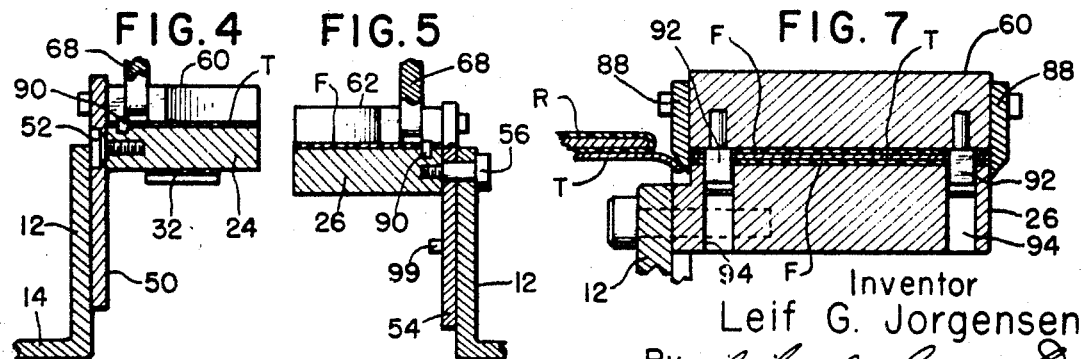
Inventor
Leif G. Jorgensen
By *Richard W. Carpenter*
Attorney United States Patent Office 3,461,022
Patented Aug. 12, 1969

3,461,022
METHOD AND APPARATUS FOR SPLICING FILM
Leif G. Jorgensen, 517 W. St. Charles Road,
Lombard, Ill. 60148
Filed May 17, 1966, Ser. No. 550,683
Int. Cl. B32b 31/18; G03d 15/04
U.S. Cl. 156—505
9 Claims

ABSTRACT OF THE DISCLOSURE

A device for splicing adjacent ends of strips of material in overlapped relation by the insertion of a piece of double-face adhesive material therebetween.

---

This invention relates to splicers, and more particularly to a device for splicing overlapping ends of strips of motion picture film, microfilm, magnetic tape, or similar articles.

The invention comprehends an improved splicer which is semiautomatic and which can trim each of the overlapping film strip ends and the splicing tape at the time the splice is made.

One of the earliest methods of splicing film strip ends was the application of a cement or adhesive to overlapping ends. This method was slow and time consuming and also had numerous other disadvantages.

Then methods and apparatus were developed to wrap a band of adhesive tape around overlapped or abutting film strip ends. Splicing of film strip ends is necessary for many reasons, including film editing. However, another major area where splicing is extremely important is in the area of film processing.

In commercial processing operations it is the common practice to join hundreds of film strips in end-to-end relation in order to form one continuous length of film which can be run through the processing equipment as an integral unit in order to attain speed and efficiency in the processing operation.

For commercial operations it is essential that the film splicing operation be extremely simple and rapid to attain the required degree of efficiency.

It is in the commercial field that this invention is particularly concerned because it does provide a simple, fast, and strong splice although, of course, its use is not limited to commercial operations alone.

It is a primary object of this invention to provide a method and apparatus for rapidly joining strips of motion picture film, microfilm, and related films and tapes by inserting a piece of double-face adhesive tape, which is sticky on both sides, between overlapped ends of the strips.

It is a further object of the invention to provide a method and apparatus for splicing wherein the jagged ends of each strip of film and the tape can be trimmed at the same time the tape is secured between the overlapped film strip ends.

A more specific object of the invention is the provision of a splicing device including a frame with a pair of aligned fixed and movable decks for supporting and positioning the film ends to be joined in overlapped relation; means for clamping the film on the deck; means for applying a strip of double face adhesive tape between the overlapped film ends; and means for trimming the ends of the film and for cutting off the tape at the same time the film ends are joined.

These and other objects of the invention will be apparent from an examination of the following description and drawings, wherein:

FIGURE 1 is a perspective view of a film splicer embodying features of the invention;
FIGURE 1a is a top plan view of a pair of overlapped film strip ends which have been spliced by the method and apparatus illustrated in the other views;
FIGURE 1b is a longitudinal vertical section taken on line 1b—1b of FIGURE 1a;
FIGURE 2 is a longitudinal vertical section taken on line 2—2 of FIGURE 1;
FIGURE 3 is a longitudinal, horizontal section taken on line 3—3 of FIGURE 2 with portions of the structure broken away;
FIGURES 4 and 5 are transverse, vertical sections taken on lines 4—4 and 5—5, respectively, of FIGURE 2;
FIGURE 6 is a front elevational view of the structure illustrated in FIGURES 1 and 2, but with the device shown in the closed position;
FIGURE 7 is a transverse, vertical section taken on line 7—7 of FIGURE 6;
FIGURE 8 is a side elevational view of a tape dispensing mechanism which forms a part of the film splicer illustrated in the other views;
FIGURES 8a and 8b are similar to FIGURE 8, but with the dispenser shown in different positions; and
FIGURE 9 is a transverse vertical section taken on line 9—9 of FIGURE 8.

It will be understood that, for purposes of clarity, certain elements have been intentionally omitted from certain views where they are illustrated to better advantage in other views.

Referring now to the drawings for a better understanding of the invention, it will be seen that the film strip ends F, which are shown as joined in overlapped relation by a piece of double face adhesive tape T in FIGURES 1a and 1b, may be spliced on the apparatus S shown in FIGURE 1.

The film splicer S includes a base or frame, indicated generally at 10, which includes a pair of parallel, vertical rear and front walls. The rear wall 12 preferably extends substantially the entire length of the device, while the front wall is preferably interrupted, to afford greater access to the apparatus for the operator, so as to comprise a pair of coplanar left and right sections 16l and 16r, respectively. Formed integrally with and extending laterally rearwardly and forwardly from the lower edges of the rear and front walls are mounting flanges or feet 14 and 18, respectively, which may be secured to a pair of generally parallel, transversely extending base plates 20 by means of a plurality of bolts 22.

Mounted on the upper portion of the left and right, as viewed by the operator and illustrated in FIGURE 1, are a pair of movable and fixed left and right decks 24 and 26, respectively. Fixed deck 26 is disposed to extend transversely in a horizontal plane between rear wall 12 and front wall right section 16r and may be fixed thereto by means of screws 28. The decks each extend approximately half the length of the frame with their inboard ends meeting medially of the frame, when the left or movable deck 24 is closed, as shown in FIGURE 6, in a manner described more fully later in the specification.

Left deck 24 is pivotally mounted at its left end, by a pivot pin 30 which extends between rear wall 12 and front wall left section 16l, for limited rotative, movement in a vertical plane between the open position, shown in FIGURES 1 and 2, and the closed poistion, shown in FIGURE 6. In its closed position left deck 24 is coplanar with right deck 26.

Normally, left deck 24 is urged upwardly to its open position by a leaf spring 32 which, as best seen in FIGURE 2, has its upper end disposed for engagement with the underside of the left deck and which has its lower end held in position by a pair of vertically spaced retaining pins 34 which extend transversely between rear wall 12 and front wall left section 16l.

Movement of the left deck from its open to its closed position is effected by the operator of the device in a manner hereinafter described.

As best seen in FIGURES 1 and 2, there are mounted at opposite ends of the frame inwardly of rear wall 12 a pair of upwardly extending, vertical left and right mounting brackets 40 and 42, respectively, which may be secured to the forward or inner side of rear wall 12 by means of screws 44.

Pivotally mounted to the rear side of the frame between the rear wall and the left and right decks 24 and 26 are a pair of vertically extending somewhat quadrant-shaped left and right guide plates 50 and 54 which are pivoted at their upper, outboard corners by pivot pins 52 and 56, respectively. The guide plates are located adjacent the rear edges of the deck to provide a rear surface or stop for proper positioning of the film in place on the decks in a manner hereinafter described, and the plates are movable in a vertical plane.

Secured to or formed integrally with the upper inboard corners of left and right guide plates 50 and 54 are a pair of generally flat, forwardly extending clamping and cutting anvil members 60 and 62, respectively, which are pivotally mounted at the sides of the left and right decks by pivot pins 52 and 56, respectively.

As best seen in FIGURE 2, the left or inboard end of right anvil member 62 is disposed outboardly or to the right of the left end of right deck 26 while the inboard end of left anvil member 60 extends inboardly of the inboard end of left deck 24 the same distance, which distance is equal to the width of the overlap splice to be made. Thus, when the device is in completely closed position with the left and right decks in coplanar relation and with the left and right anvil members in closed relation, the anvils are also in substantially coplanar relation with the left anvil member disposed to extend over the marginal end portion of the right deck.

Actuation of the anvil members and attached guide plates may be accomplished by a pair of hand operated left and right levers 64 and 66 which are pivoted at their lower ends to left and right mounting brackets 40 and 42, respectively, by pivot pins 70 and which have handles 72 at their upper ends.

Each of the levers is connected by a pivot pin 74 to one end of its related link 68 with the other end of the link being connected to its related guide plate by a pivot pin 76.

As best seen in FIGURE 2 the adjacent inboard ends of the left and right anvil members are provided with cooperating shearing edges 80 and 82, respectively, for trimming the right end of the left film strip mounted on the left deck and the adjacent inboard ends of the left and right decks are provided with cooperating shearing edges 84 and 86, respectively, for trimming the left end of the right film strip mounted on the right deck in a manner hereinafter described. Also, as best seen in FIGURE 7, the left anvil member may be provided at the side edges of its inboard end with a pair of vertically disposed cutting blades 88 adapted to engage the side edges of the inboard end of the right deck to trim the front and rear ends of the tape after it has been interposed between the overlapped ends of the adjacent film strips in a manner hereinafter described.

When the apparatus is to be used in splicing film which has sprocket holes, such as the 35 mm. motion picture film illustrated as an example in FIGURES 1a and 1b the deck may be provided at their outer side edges with upwardly projecting aligning pins 90 which are spaced from each other longitudinally of the deck a distance equal to the distance between the sprocket holes of the film being spliced.

In order to provide for the perforation of the overlapped film strip ends as well as the tape interposed therebetween the left anvil member and the right deck may be provided with punch and die elements 92 and 84, respectively.

Also, if desired, in order to free the operator's hands for manipulation of the film, the anvils and attached guide plates may be foot operated by the provision of pedal means, not shown, which are connected to the guide plates by connecting lever arms or links 96 which may be pivotally connected to the guide plates by pins 97. As this is an alternate arrangement the lever arms 96 are shown in phantom line.

In order to prevent the anvil and guide plates from being rotated too far when being moved to the open position, there may be provided stop pins 99 on the guide plates which are engageable with the underside of the decks to limit movement.

Now the operation of the splicer apparatus will be described in detail prior to the description of the tape dispensing mechanism. Suffice it to say that the tape dispensing mechanism is capable of delivering a strip of double face adhesive over the left end of the film strip on the right deck when required.

In order to splice a pair of film strip ends, they are placed on the left and right decks with their free ends extending slightly beyond the inboard ends of the decks, as shown in FIGURE 2. If the film being spliced has sprocket holes, as does the film in the example shown in FIGURES 1a and 1b, the film is positioned with the aligning pins of the deck extending through the sprocket holes. Of course, in any case the film is placed flatwise on the decks with the rearward side edge of the film abutting the inside of front side of the guide plates.

The right clamping and cutting anvile member is then lowered over the right deck, as shown in FIGURE 2, by rotating the right lever in a counterclockwise direction to clamp the film in place on the deck.

At this time a lever of the tape dispensing mechanism is pulled forward to deliver a strip of double face adhesive tape and position it transversely across the upper surface of that portion of the film strip on the right deck which is located between the inboard end of the right anvil member and the inboard end of the right deck.

After the tape has been placed over the left end of the right film strip, the left anvil member is urged downwardly, by the clockwise rotation of the left lever. As the left anvil moves downwardly it contacts the left film strip therebetween. As the left anvil engages the left deck and continues to move downwardly it causes the left deck to move downwardly also from the open position, shown in FIGURE 2 to the closed position shown in FIGURE 6.

As this action takes place four other different actions take place almost simultaneously. First, the pairs of cooperating shearing edges 80–82 of the anvils and 84–86 of the decks trim the extremities of the left and right film strips, respectively, and the cut portions of the film fall out of the way. Second, the punch and die elements 92 and 94 of the left anvil and right deck, respectively, cooperate to punch sprocket holes through the overlapped film ends and the tape. Third, the film ends are brought together to sandwich the double face adhesive tape therebetween and form the actual film splice between the left anvil member and the right deck. Fourth, as the cutting blades on the left anvil come down against the opposite sides of the inboard end of the right deck the adhesive tape is trimmed at the side edges of the film strips, so that none of the tape is exposed. Of course, if the tape dispenser is set to deliver a strip of tape the free end of which does not extend beyond the forward side edges of the film, the front cutting blade may be omitted, and only a rear cutting blade provided to sever the tape from the roll at the splice.

Thus, it will be seen that the invention provides a highly efficient apparatus and method of splicing film whereby an operator can rapidly insert the film ends to be spliced, move the first anvil into place, deliver the tape, and move the second anvil in place to complete the splicing operation. As was previously mentioned the anvil levers as well as the tape dispenser lever could all be readily adapted for foot operation to free the operator's hands for insertion and removal of the film.

In fact by a simple mechanical linkage, not shown, both anvil members and the tape dispenser lever could all be automatically actuated in a motor driven operation wherein, after the operator has placed the film in position he depresses a switch button, and the first anvil member, the tape dispenser lever, and the second anvil member are automatically actuated in rapid succession.

Now, to describe the tape dispensing mechanism, indicated generally at D, which is shown in FIGURES 8, 8a, 8b, and 9.

The tape dispenser is adapted to deposit a strip of predetermined length of double face adhesive tape, to a flat surface. In the example illustrated the flat surface is the upper, horizontal surface of the right deck 26 of the film splicing apparatus indicated generally at S.

The dispenser may be mounted on a vertical wall 95 of a base or support, which in this case is the frame 10 of the film splicer S.

The dispenser, as best seen in FIGURE 8, includes relatively thin, vertical side plate 100 which is somewhat pie-shaped in contour in the illustration shown in the drawing. Although the specific contour of the side plate is not essential to the invention.

Secured to or preferably formed integrally with the upper horizontal edge of side plate 100 is a relatively narrow, elongated, horizontal top plate 102 extending outwardly therefrom at right angles to the side plate. Top plate 102 may be provided with an elongated slot 103 extending longitudinally of the plate for a major portion of its length.

The purpose of the slot is to accommodate the receipt of a pair of front and rear pawls or gripping elements 104 and 106, respectively, the function of which will be described later in the specification.

Projecting outwardly from side plate 100 directly under top plate 102 is a shaft or spindle 108 adapted to carry a roll of double face adhesive tape T. It is understood that, because double face adhesive tape is sticky on both sides it is packaged in a roll with a release strip R which prevents one layer of the tape from adhering to itself, but which can be readily separated from the tape when desired.

As best seen in FIGURE 9 a second horizontal plate or shelf 110 is secured to or formed integrally with side plate 100 and is disposed to extend laterally outward therefrom directly under and in parallel relation with top plate 102. Shelf 110 is positioned a very slight distance below top plate 102 and its forward end 112 exends forwardly beyond the forward limits of plates 100 and 102.

Dispenser side plate 100 is movably mounted on vertical wall 95 of the base by means of a parallel linkage arrangement which includes a vertical operating lever 114 and a parallel vertical link 116 which are interconnected by a tension spring 118 operative to urge the dispenser to its rearward or inoperative position, as illustrated in FIGURE 8.

Lever 114 is pivotally connected at its lower end to wall 95 by pivot pin 120 and is pivotally connected at a higher location intermediate its ends to side plate 100 by a pivot pin 122. Likewise link 116 is pivotally connected at its lower and upper ends to the base wall 95 and side plate 100 by pivot pins 124 and 126, respectively.

Although the lever and link are disposed in parallel relation, it will be noted that the link upper pivot pin is disposed to ride in a vertical slot 128. This enables the side plate to angle or rotate slightly in a clockwise direction, as shown in the drawings, and in a manner hereinafter explained in greater detail.

Spring 118 may be attached at its opposite ends to lever pivot pin 122 and link pivot pin 124 so as to urge the side plate to its rearwardmost position or to the left as shown in FIGURE 8.

Still referring to FIGURE 8, it will be seen that forward pawl 104 is mounted for lateral movement in top plate slot 103 and includes a vertical flange 130 having teeth 132 on its lower edge and having its upper end pivotally connected by pin 134 to the lower end of an operating link 136 the upper end of which is pivotally connected by pin 138 to an upper portion of operating lever 114. A wire spring 139 may be provided at the connection between lever 114 and link 116 to urge the link and related pawl 104 downwardly toward the top plate and shelf of the dispenser.

Rear pawl 106 also includes a vertical flange 140 with teeth 142 at its lower edge and having its upper end connected by a pin 144 to a bracket 146 carried on the top plate 102. A wire spring 148 may be provided at the connection to urge the pawl downwardly toward the top plate and shelf of the dispenser.

Before describing the operation of the mechanism it will be necessary to describe the manner in which the combined roll of double face adhesive tape and release strip is mounted on and fed through the dispenser.

As best seen in FIGURE 8b, the roll is so mounted on spindle 108 of the side plate that when it is unrolled by being pulled to the right the layer of release material will be on top of the adhesive tape.

In the initial setup of the dispenser the tape is separated from the strip of release material and extended straight out forwardly from under the top shelf of the dispenser across the flat horizontal surface of the deck. The release material is then folded 180° back or rearwardly on top of the top shelf extension 112 and then is drawn rearwardly between the shelf 110 and the top plate 102 until it passes under the forward and rear pawls and extends rearwardly of the dispenser as shown in FIGURE 8. The exposed portion of the tape which located forwardly of the shelf extension 112 is then cut off and removed, and the dispenser is loaded and ready for the initial application.

In order to separate a predetermined length of double face adhesive tape from the release material and deposit it on the article to which the tape is to be applied, the article is first placed on the flat surface of the table or deck adjacent the dispenser. In this case the article to which the tape is to be applied is the left end of the right strip of motion picture film located on the right deck of the adjacent film splicer.

When the article is in place operating lever 114 of the dispenser is rotated clockwise or moved to the right, as shown in the drawing. As this occurs the rear pawl engages the upper surface of the release material and prevents it from moving relative to the dispenser shelf. Thus, the movement of the lever transports the entire dispenser to the right to the position illustrated in FIGURE 8a. Because of the parallel linkage arrangement with lever 114 and link 116, the dispenser actually moves forward in an arcuate path so that the shelf extension 112 is brought down on top of the film strip end on the deck when the dispenser reaches its forwardmost position, as shown in FIGURE 8a. As the tape is under the shelf extension it is brought down on top of the article to be taped, that is the film, and will adhere to the article.

The purpose of the pin and slot connection 126–128 between link 116 and side plate 100 is to permit the plate and related parts of the dispenser to tilt slightly forward and thereby insure firm positive contact between the tape and article. When the plate is advanced the lower edge of the plate contacts a stop 150 on vertical wall 95 of the base, and the slot 128 allows the side plate 100 to ride up a slight amount to provide the previously described tilting action. Rearward movement of lever 114 is limited by another stop 152 on vertical wall 95 of the base.

After the tape has been applied to the film the operating lever is rotated counterclockwise or moved to the left as shown in FIGURE 8b. As the lever is moved to the rear two actions take place at substantially the same time. First the dispenser side plate is moved rearwardly away from the base, and secondly forward pawl 104 engages the release strip and moves it rearwardly on the shelf 110 to pull it away from the tape which remains in place adhered to the article taped.

The rearward movement of the dispenser coupled with the rearward movement of the release material causes the roll to unwind, in a clockwise direction as shown in FIGURE 8b, and thereby present another section of adhesive tape under the shelf extension 112 which will serve for the next application of tape as the entire process is repeated. Thus, it will be seen that the novel dispensing mechanism will rapidly separate double face adhesive tape from a roll of release material and apply it in strips of predetermined lentgh upon a flat surface merely by moving the operating lever forward and backward.

After each strip of tape is applied it may be severed from the remainder by means of any type of cutting device, such as the blade 88 on the left anvil of the splicing device.

The length of the strip of tape which is applied in the operation is determined by the length of the shelf extension 112 and the linkage arrangement which moves the dispenser into and out of tape applying position. These factors can be varied to suit the particular conditions which are required for any particular application.

I claim:
1. In a device for splicing adjacent ends of a pair of longitudinally aligned strips of material, such as motion picture film or the like, in overlapped relation by interposing therebetween a piece of double-face adhesive tape, the combination of:
  (a) a frame;
  (b) a pair of longitudinally aligned fixed and movable decks on the frame having inboard ends disposed adjacent each other;
  (c) the fixed deck being disposed in a horizontal plane;
  (d) the movable deck being pivotally mounted at its outboard end on the frame in a cantilever arrangement for rotational movement about a horizontal axis between a closed position coplanar with said fixed deck and an open position with its inboard end being spaced above the adjacent inboard end of the fixed deck;
  (e) means for positioning a pair of first and second strips on the movable and fixed decks, respectively, with an end of said first strip overlying, but spaced above, an adjacent end of said second strip;
  (f) a mechanism for applying a piece of double-face adhesive tape over the end of said second strip;
  (g) means for moving said movable deck downwardly from its open to its closed position to place the end of said first strip over said tape and thereby effect a splice.

2. A device according to claim 1, and including a pair of anvil members mounted on said frame over said decks and being movable toward said decks to clamp said strips in position on said decks.

3. A device according to claim 2, wherein said anvil members have a pair of cooperating cutting edges at their inboard ends and wherein said decks have a pair of co-operating cutting edges at their inboard ends for trimming excess material from the ends of the first and second strips, respectively.

4. A device according to claim 3, including means for moving said movable deck and its related anvil downward to its closed position to place the end of said first strip over said tape and to trim excess material from the ends of said strips at substantially the same time.

5. A device according to claim 4, and including a cutting edge on one of said anvil members operable to sever the tape at one side of said strips.

6. In a device for splicing adjacent ends of a pair of longitudinally aligned strips of material, in overlapped relation by interposing therebetween a piece of double-face adhesive tape, the combination of:
  (a) means for supporting the respective strips in longitudinal alignment with their adjacent ends spaced from each other;
  (b) means for applying a piece of double-face adhesive tape transversely across the end of one of said strips;
  (c) means for pressing the end of the other strip onto the tape to sandwich the tape between the overlapped ends of said strips to effect a splice joint between;
  (d) said strip supporting means including means for trimming adjacent ends of both of said strips at substantially the same time said pressing means is moving said strip ends together to sandwich said tape therebetween.

7. A device according to claim 6, and including means for trimming excess material from each of the strip ends outwardly adjacent the related side edge of the tape.

8. A device according to claim 7, and including means for actuating said pressing means and said trimming means at substantially the same time.

9. A device according to claim 6, and including means for severing the tape at one side of said strips.

References Cited

UNITED STATES PATENTS

| 3,245,861 | 4/1966 | Roshkind | 156—157 |
| 3,379,597 | 4/1968 | Di Francesco | 156—519 |

DOUGLAS J. DRUMMOND, Primary Examiner

U.S. Cl. X.R.

46—147; 161—14